Patented Nov. 21, 1922.

1,436,158

UNITED STATES PATENT OFFICE.

WILLIAM C. FISHER, OF MIDDLETOWN, CONNECTICUT, ASSIGNOR TO THE RUSSELL MANUFACTURING CO., OF MIDDLETOWN, CONNECTICUT, A CORPORATION.

CLUTCH FACING AND PROCESS OF MAKING SAME.

No Drawing. Application filed February 25, 1921. Serial No. 447,855.

*To all whom it may concern:*

Be it known that I, WILLIAM C. FISHER, a citizen of the United States, residing at Middletown, county of Middlesex, State of Connecticut, have invented certain new and useful Improvements in Clutch Facings and Processes of Making Same; and I do hereby declare the following to be a full, clear, and exact description of the invention, such as will enable others skilled in the art to which it appertains to make and use the same.

This invention relates to clutch facings and the like; and it has to do more particularly with shaped friction elements, such as clutch rings and other forms of frictional facings, embodying a composition comprising fibrous material such as asbestos, and a hardened condensation product such as a phenolic condensation product, most desirably associated with one or more additional ingredients serving to augment the frictional properties of the shaped articles or otherwise to modify their characteristics desirably.

Friction elements embodying the principles of the invention in the best form now known to me consist of shaped bodies of a composition comprising principally asbestos asociated with a synthetic resin or condensation product, such as a phenol-formaldehyde condensation product like bakelite for example, or some other suitable resinous condensation product; various synthetic condensation products of this character being well known in the art and their preparation well understood.

As the present invention is of greatest utility in connection with the manufacture of clutch facings, this phase of the invention will be referred to more particularly hereinafter and will be described in detail by way of concrete example for the sake of affording a more complete understanding of the essential principles of the invention.

Frictional clutch facing elements are employed in a wide variety of situations where it is necessary to effect adjustable or intermittent connection between a driving member and a driven member. One of the most widespread uses of such elements is in clutches employed in motor driven vehicles for connecting and disconnecting the motor and running gear. Clutches for this purpose are usually either of the cone type or the multiple disk type. In order to give satisfactory service, clutch facings must satisfy very exacting requirements since they are subjected to hard usage and other trying conditions in actual use. Such material must possess a relatively high coefficient of friction and be extremely resistant to wear. Moreover it must not only be strong and durable, but its strength and durability must not be affected to a great extent at temperatures considerably above ordinary atmospheric temperatures, because the cooperating surfaces of a clutch device often heat up considerably in service. Moreover, the clearance by which the cooperating clutch surfaces are separated when in unclutched or idle relation is ordinarily slight; so that it is of primary importance that the clutch facing elements shall not swell or otherwise become deformed when heated up and thus prevent disengagement of the cooperating surfaces when desired. In the case of the well known multiple disk type of clutch these service requirements are particularly exacting. In such clutches, a very slight swelling or other deformation of the cooperating clutch elements will result in binding or locking the cooperating elements together in such manner as to make it imposible to unclutch the motor from the running gear.

Prior to my invention, the only type of clutch facing that has proved successful in practice for disk clutches was woven asbestos fabric frictioned in one way or another to provide the necessary gripping qualities. Clutch facings of this character ar relatively expensive owing to the high cost of the high grade long staple asbestos necessarily employed in the spinning and weaving operations by which the fabric is made. This and other factors led to a general recognition of the desirability of employing unwoven short fiber asbestos for making clutch facings; but the numerous practical difficulties standing in the way of manufacturing a clutch facing of unwoven asbestos were so numerous that no satisfactory solution of the problem had been reached prior to my invention so far as I am aware. It has been proposed for example to mix various binders with short fiber asbestos and to mold or otherwise form rings and other clutch surfacing elements from the mixture into the desired shape; but none of these proposed clutch surfacing elements gave satisfaction in actual use owing to lack of sufficient strength and wear resisting qualities, and also to the tendency to swell when heated, so that their use in multiple disk clutches was found to be impractical.

I have discovered that unwoven short fiber asbestos can be worked up into clutch facings that will meet the exacting requirements of actual service, provided the fibrous mass comprise a binder and indurating agent consisting largely of a condensation product of the general character above described, a phenolic condensation product such as bakelite being eminently suited for the purpose, especially when modifying and friction-augmenting agents are incorporated in the mixture. By virtue of this discovery, the manufacture of high grade clutch facings and the like is materially simplified and the cost much reduced. In practice it is desirable to employ the condensation product in conjunction with other ingredients conferring upon the mixture additional desirable characteristics such as a higher coefficient of friction, greater toughness and pliability, etc., than is attainable by the use of the condensation product alone associated with the asbestos fiber. For example, the addition of rosin or other suitable resin (whether synthetic or not) has the effect of increasing the frictional properties of the mixture when employed in proper proportion; or cork in ground or shredded condition may be employed to accomplish a similar result. A protein substance such as casein may also be employed to increase the strength of the bond between the fibers and to confer horny characteristics and toughness upon the finished article.

According to one specific mode of carrying out the invention in practice, a high grade asbestos board or sheet may first be prepared in a manner analogous to the manufacture of paper or ordinary cardboard; after which the board may be cut into the particular shape or shapes desired, and these shapes impregnated with a solution of the soluble condensation product selected, then dried, and finally baked to convert the condensation product into its final hardened condition, in which it is preferably both substantially infusible and insoluble.

For example, 300 pounds of short asbestos fiber and 450 pounds of waste cuttings from previously formed asbestos board used in making up clutch rings such as those herein question, are placed with a large amount of water in a pulp beater such as is used in ordinary paper making and the beater is operated to grind up and pulp the fiber. A suitable binder or cementing agent such as casein, accompanied or not by other ingredients useful in conjunction with such agent for promoting the production of a tough coherent fibrous mill board, is then added to the mixture in the beater. Where casein is used as this cementing or binding agent, the employment of 35 to 40 pounds of casein with the weight of fiber above mentioned will give satisfactory results; and the addition of formalin (40 per cent formaldehyde) say half a gallon or so, renders the casein substantially insoluble and also serves to prevent decomposition of any casein remaining in the beater after removal of the mixture. After the addition of the casein binder, the beater is run for several hours, or as long as may be necessary to thoroughly pulp the mixture and coat the asbestos fiber with the binder; after which the pulp may be fed upon the traveling apron of a machine for making paper or cardboard, the resultant sheet being wound from the apron upon a receiving roll to build up the required thickness, this building up being preferably conducted with the aid of pressure on the roll to compact and densify the board produced. The cylindrical body of asbestos board thus built up on the roll is then split longitudinally and heavily pressed to squeeze out the excess liquid, and to thoroughly compact and densify the mass; after which the sheets are dried with the aid of heat and cut into strips. The pressure and heat assist the setting action of the casein binder or cement. If it is desired to calender the board, the strips are moistened again slightly, and then calendered. The board is cut by means of dies into rings or other shapes desired and is then ready for impregnation with the solution of condensation product. The shapes thus prepared are strong, of dense and compact texture, but absorptive. Any other suitable method of building up the board to the proper thickness may of course be employed instead of that described above.

If rosin or other friction-increasing resin is to be employed in the friction elements, it should preferably be used in such proportions as not to exceed about 10 per cent by weight of the asbestos fiber present in the finished article. The rosin is conveniently introduced in company with the condensation product in the impregnating solution. The condensation product employed as the principal indurating agent may be, for example, a liquid soluble condensation product obtained by reaction between phenol and formaldehyde in the presence of a suitable condensing agent, such as a small percentage of caustic soda; such soluble condensation products being well known and commercially available or readily prepared by known methods. A suitable impregnating solution is obtained by dissolving in alcohol the soluble condensation product and rosin, sufficient alcohol being employed to give a solution of proper fluidity to ensure efficient impregnation. The asbestos board is then immersed in the described alcoholic solution for a sufficient period to insure substantially complete impregnation and saturation of the asbestos board rings or other shapes, the period of immersion naturally depending largely upon the thickness of the rings. The impregnated rings are then carefully dried at temperatures most desirably not substantially exceeding 140° or 150° F., after which it is best to press them while still flexible to flatten them out and secure acurate parallelism of their opposite faces. The rings are next heated to a higher temperature sufficient to harden the condensation product into final form and preferably to render the same substantially infusible and insoluble. The hardening temperature should ordinarily be above 300° F. but need not exceed 400° F. as a rule. The baking or hardening operation may be conducted under pressure or not; but if pressure is not employed, the thickness of the asbestos board should be so calculated as to allow for a very slight expansion or swelling of the rings which occurs. When strong dense board of the character above described is employed, the swelling is barely noticeable. Allowance can be made for this slight swelling to ensure that the final thickness of the ring is exactly that desired in the finished clutch ring. Whether pressure is employed or not, the rings may be maintained between smooth facing plates or separators during the hardening operation in order to prevent warping or other distortion of the rings; or this object may be attained by simply holding the rings at spaced points about their peripheries with substantially their entire surfaces free. In the latter case the surfaces of the finished indurated article are of satisfactory accuracy; and it has been found that their somewhat less smooth character, as compared to articles hardened between separating plates, renders them especially suitable for use as clutch elements.

Instead of incorporating the rosin in the friction element by introducing it in solution with the soluble phenolic condensation product employed, I may precipitate it on the fiber in the beater in a manner similar to the employment of rosin size in papermaking. The rosin size may be made up in any well known or suitable manner, as by heating rosin with sufficient soda ash and water to give a water soluble product. This is added to the asbestos fiber stock in the beater, and after the size has been thoroughly mixed with the stock the rosin is precipitated on the fiber by a suitable precipitant such as alum. The moist asbestos board obtained from the sized stock is heated, preferably under heavy pressure, to form say 150° to 300° F. to produce a compact solid mass, and may be calendered or otherwise finished as before described. Clutch rings or other shaped friction elements cut or stamped therefrom may then be impregnated with an alcoholic solution of a phenolic condensation product and further treated to produce the finished article, as already described.

It is also feasible to incorporate the rosin by combining both methods of introduction above described; that is, both by precipitating it on the fiber in the beater and also by introducing it as a part of the impregnating solution, in company with the phenolic condensation product.

If cork is used as the friction-augmenting agent, it may be mixed in ground or shredded form with the asbestos fiber in the beater in proportion desirably not exceeding 10 per cent by weight of the asbestos fiber, and may be thoroughly incorporated with said fiber by the action of the beater. The shapes cut from the resultant board are impregnated with a solution of a resinous condensation product, and the final hardening and indurating carried out as before.

It is often desirable to incorporate a softening agent with the mixture of which the shaped friction element is composed. Any suitable softening agent may be employed for this purpose and at any convenient stage of the process. For example, after forming clutch rings in the manner above set forth, and after the same have gone through the hardening operation, the rings may be immersed in a 10 per cent solution of glycerine in water and allowed to take up as much of the glycerine solution as they will. Rings thus treated and subsequently dried out possess additional desirable properties, notably a uniformity in the frictional properties over their faces; and their toughness and resistance to wear is enhanced.

While the preparation of asbestos board especially suitable for the purposes in view has been described in explaining the principles of the invention, it is to be understood that any asbestos board available, if of proper strength, toughness and compactness, may be employed. I have found, however, that even so-called high grade commercial asbestos board is commonly unsuitable because insufficiently compact and coherent, often because it is so weighted with inert adulterants as to disintegrate more or less in the impregnating treatment. It is essential for best results that the board from which the shapes are cut be strong, compact and comparatively resistant to deformation.

Clutch rings and other shaped friction elements made in accordance with the invention possess the necessary frictional characteristics required in articles of this kind, are strong and durable, and are substantially unaffected by the highest temperatures to which they may be subjected under the usual service conditions. I believe it to be broadly new to provide such friction elements comprising fibrous material and a hardened condensation product.

My invention also comprises the process of manufacturing friction elements as hereinabove described.

What I claim is:

1. As a new article of manufacture, a clutch facing comprising a shaped body of a mixture of unwoven asbestos fiber with a binder comprising a hardened phenolic condensation product, and a friction-augmenting agent associated with said mixture.

2. As a new article of manufacture, a clutch facing comprising a shaped body of a hardened mixture comprising asbestos fiber, a resinous condensation product, and another resinous material having friction-augmenting properties.

3. As a new article of manufacture, a clutch facing comprising a shaped body of a hardened mixture comprising asbestos fiber, a resinous condensation product, and rosin.

4. As a new article of manufacture, a clutch facing comprising a shaped body of a hardened mixture comprising asbestos fiber, a phenol-formaldehyde condensation product, and rosin.

5. As a new article of manufacture, a shaped body of the character described comprising asbestos and an admixed binder compacted into a porous mass resistant to deformation, and a hardened indurating agent filling the pores of said mass.

6. As a new article of manufacture, a shaped body of the character described comprising a mixture of comminuted asbestos and cork with a binder compacted into a coherent porous mass, and a hardened phenolic condensation product filling the pores of said mass.

7. As a new article of manufacture, a shaped body of the character described comprising asbestos and an admixed binder compacted into a porous mass resistant to deformation, the pores of said mass being filled with a hardened phenolic condensation product having a high coefficient of friction.

8. The process which comprises forming a compact, coherent and deformation-resistant but absorptive shaped mass from a mixture of finely divided material with a binder, impregnating said mass with a resinous condensation product in liquid condition, and hardening said condensation product.

9. The process which comprises forming, from a mixture comprising asbestos and a binder, a coherent shaped article resistant to deformation, impregnating said article with a liquid indurating agent comprising a phenolic condensation product, and hardening said indurating agent.

10. The process which comprises forming, from a mixture comprising asbestos and a binder and with the aid of heat and pressure, a coherent shaped article resistant to deformation, impregnating said article with a liquid indurating agent comprising a phenolic condensation product, and drying and heating the impregnated article without maintaining it under pressure.

11. The process which comprises pulping a mixture comprising comminuted asbestos, cork, and a liquid binding medium containing a protein and a hardening agent therefor, forming a compact coherent shaped article from the pulped mixture with the aid of heat, impregnating said article with an indurating medium, and drying and heating the impregnated article.

12. The process which comprises comminuting asbestos fiber and cork, mixing therewith a liquid binding medium to produce a pulp, forming compact shaped articles from said pulp with the aid of heat and pressure, impregnating the shaped articles with an indurating medium and drying and heating the impregnated articles.

In testimony whereof I hereunto affix my signature.

WILLIAM C. FISHER.